United States Patent Office 3,396,567
Patented Aug. 13, 1968

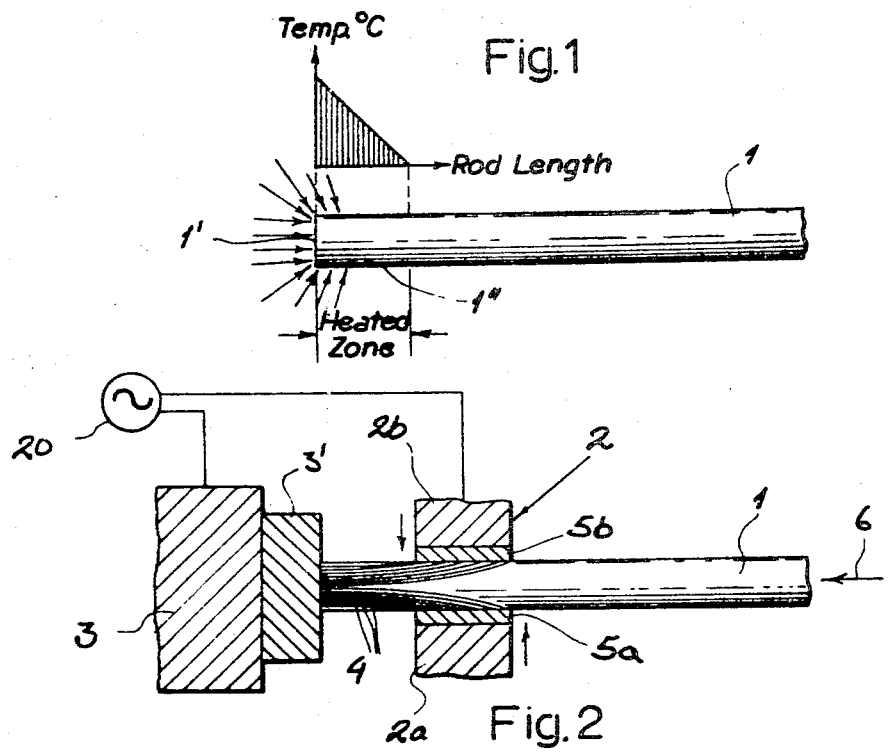
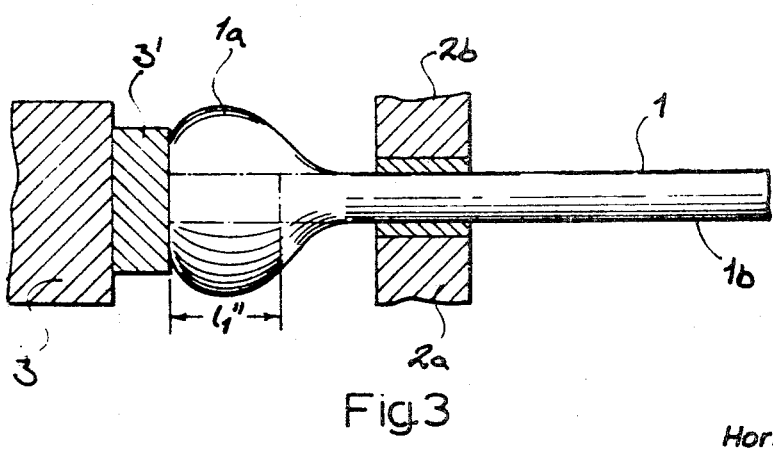

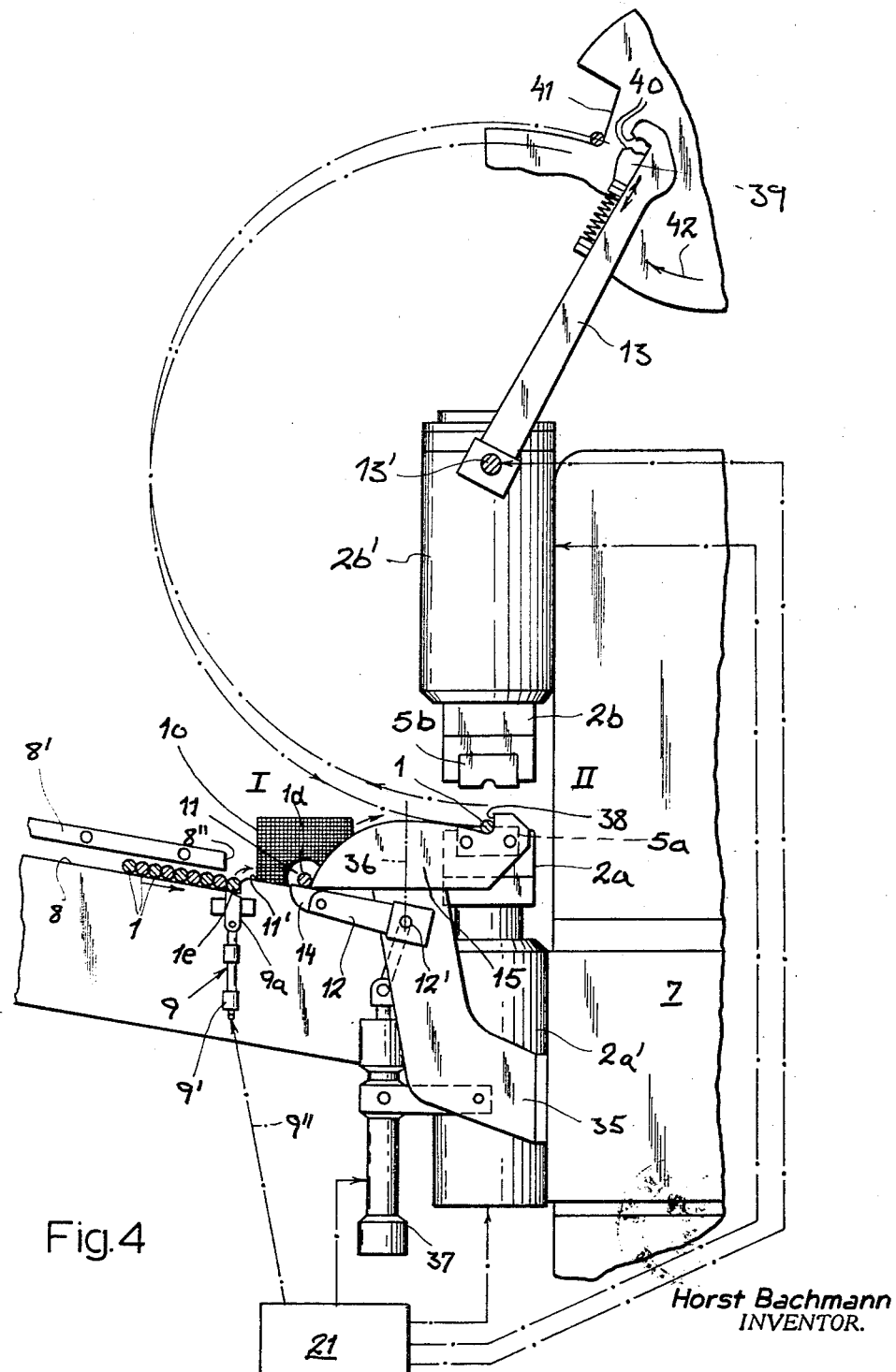

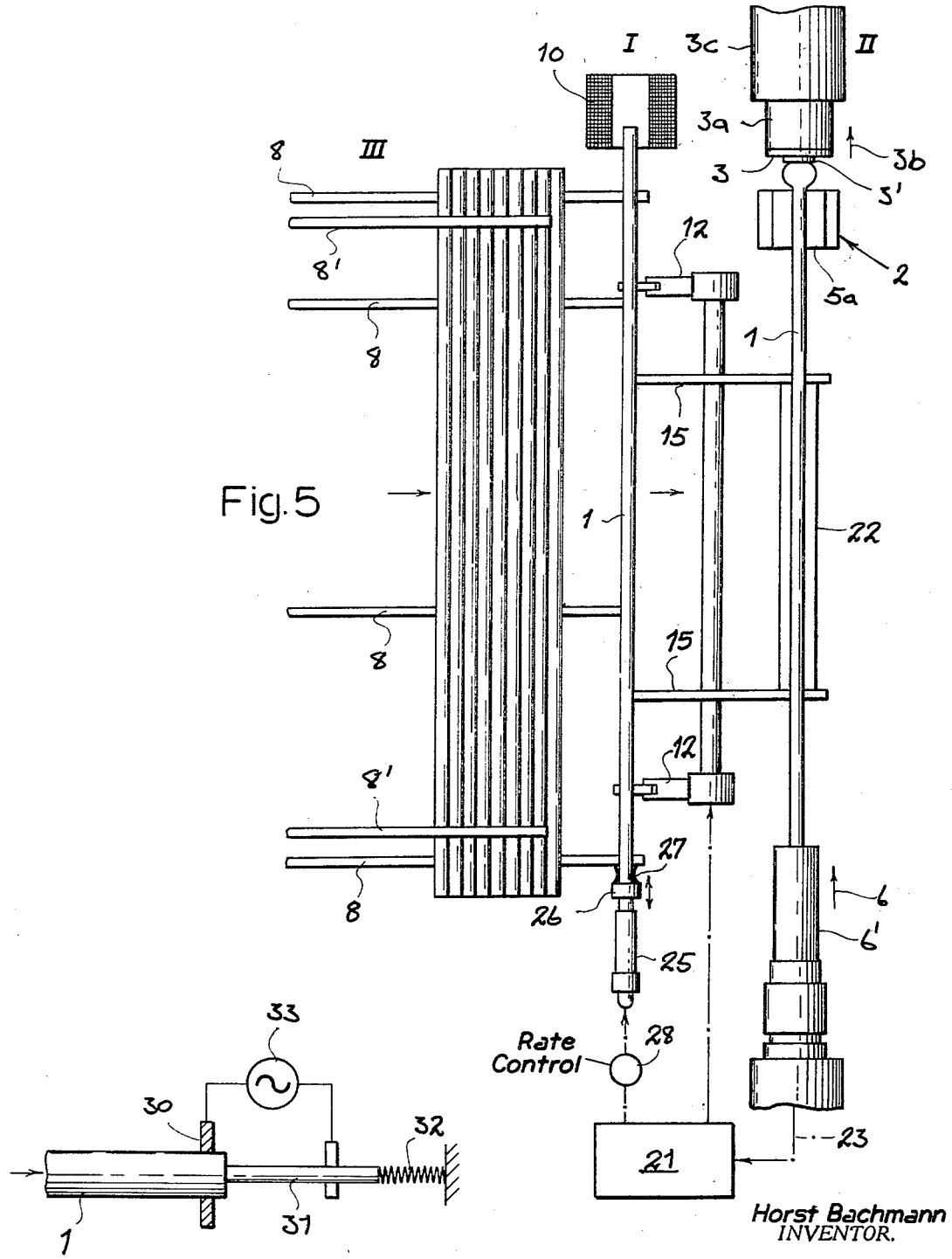

3,396,567
APPARATUS FOR THE HEADING OF
CONDUCTIVE WORKPIECES
Horst Bachmann, Haan, Rhineland, Germany, assignor to Maschinenfabrik Hasenclever A.G., a corporation of Germany
Filed Dec. 6, 1965, Ser. No. 512,270
Claims priority, application Germany, Dec. 4, 1964, M 63,351
6 Claims. (Cl. 72—318)

ABSTRACT OF THE DISCLOSURE

A heading press having an electrical heating system for raising the temperature of an end of the workpiece prior to the application of axial force to the latter and a preheating device adjacent the heading press for inductively heating the end of the workpiece, an automatic system substituting the headed rod for the preheated rod upon completion of the heading and preheating operation.

---

My present invention relates to the enlargement of elongated workpieces (such as rods, bars and the like of steel or other metal), at one or both extremities, by heating the respective extremity and applying axial pressure to the workpiece against an anvil which is stationary or, at most, limitedly movable; more particularly, this invention relates to heading presses and like apparatus whereby the bar or rod is brought to the deformation temperature by heating within the press.

In my copending application Ser. No. 482,231, filed Aug. 24, 1965, now U.S. Patent No. 3,347,081 of Oct. 17, 1967, I describe a heading press for the enlargement of intermediate zones of metallic rods and bars by the resistive heating of these zones with the aid of an electric current passed through the zone between a clamping electrode engaging the periphery of the workpiece and an anvil electrode against which the workpiece abuts. Such presses, in which the deformation pressure is obtained by an axial displacement of an unsoftened portion of an elongated workpiece to enlarge a softened portion by restricting the movement of an opposite end of the workpiece via an anvil or the like are described generally as "heading presses" and the essential deformation operation will be referred to hereinafter as the "heading" of a workpiece. This terminology, commonly used in the art, derives from the fact that most "heading" operations are designed to form an enlargement at an end of the elongated workpiece not unlike the head of a bolt, pin, shaft or nail, although enlargement at intermediate locations are frequently described as "headers" for convenience.

While such presses may make use of a variety of heating means, it has been found to be preferable to heat the workpiece in situ by passing a resistive-heating current through the end of the workpiece to be enlarged, the anvil being formed as a counter electrode for this purpose. The other electrode engages the periphery of the workpiece and can be considered a clamping-electrode means since a plurality of parts of this latter electrode may be brought together against the workpiece at a distance from the anvil electrode corresponding to the heating zone. After the resistive-heating current has brought the workpiece to the desired deformation temperature, axial pressure is applied to the rod or bar to force the latter against the anvil electrode and flare outwardly of the heated region. While this process is generally efficient, it has been found to have some important disadvantages. Thus, for example, nonuniform heating of the deformable end of the workpiece, because of the current-flow conditions, causes an overlapping of material without corrugation or overlapping of the workpiece material. Apparently, the end face of the workpiece abutting the anvil electrode is not heated to the same temperature as the portion of the workpiece in the region of the clamping electrodes and thus is not as capable of expansion as are the more heated regions. A similar lack is observed at the edges bounding the end faces and, especially when sharp edges are provided, the workpieces are detrimentally affected by overlapping, bulging and irregular deformation. It has been found to be difficult, if not impossible, to control the formation of such irregularities in conventional electric heading presses and, indeed, it is frequently necessary to bevel or otherwise shape the workpiece before heading or to machine the rod after heading to prevent the formation of the irregularities or eliminate them. In either case, the expense, manufacturing time and after-handling are increased while apparatus efficiency and production rate are reduced.

It is, therefore, the principal object of the present invention to provide an improved method of operating a heading apparatus and of heading elongated workpieces whereby maximum utilization can be obtained from an electric heading press without disadvantageous formation of overlaps or the like during the heading process.

A further object of this invention is to provide a method of heading elongated workpieces (e.g. steel rods or bars) at one end thereof at a higher rate than has been possible heretofore, without the need for after-handling of the workpieces and in a manner free from the disadvantages of nonuniform heating.

A further object of this invention is to provide an apparatus for carrying out the improved method.

The above and other objects which will become apparent hereinafter are attained, in accordance with the present invention, by a method which is based upon my surprising discovery that the consequences of nonuniform heating of the workpiece, whether arising from contact characteristics of the electrode of a heading press, the configuration of the workpiece, the manner in which the workpiece abuts the anvil electrode or the conductivity or the deformability of the workpiece, can be eliminated in spite of the fact that an electric heading press is used when, prior to the heading operation, the workpiece is preheated at its end to be deformed progressively axially inwardly and then is engaged between the resistive heating electrodes of the heading press and brought to the final deformation temperature, whereupon axial heading pressure is applied.

Thus, the method of the present invention involves the preheating of the end of the workpiece to be deformed, preferably by progressively advancing the workpiece into a heating device (e.g. an induction-heating coil or resistive-heating electrode) and thereafter transferring the hot workpiece from the first or preheating location to the second or heading location in which the workpiece is engaged by the clamping-electrode means and is further heated to the deformation temperature with the axial pressure being supplied by a suitable pressure means. It has been found that the progressive axially inward heating of the end of the workpiece to be formed balances any inherent nonuniformity of the electric heating action which is concentrated at inward locations, thereby ensuring that the deformable end is substantially uniformly heated. Best results have been obtained with inductive heating since its is observed that the edges of the workpiece are most strongly heated, as is the end face of the workpiece. When the thus-heated workpiece is subsequently processed in the heading press, overlapping and bulge formation are entirely obviated. A further advantage of the system of the present invention is that the distance between the clamping electrodes and the anvil electrode can be substantially greater than the corresponding distance of conventional devices, thereby eliminating the requirement of conventional systems for large current flows corresponding to reduced resistivity.

The above and other objects, features and advantages of the present invention will become more readily apparent from the following description, reference being made to the accompanying drawing in which:

FIG. 1 is an elevational view showing a rod-like workpiece, according to the invention, together with a graph of the heated characteristics of the workpiece after the initial step of the present invention;

FIGS. 2 and 3 are diagrammatic elevational views, partly in section, showing successive stages of the improved method;

FIG. 4 is a vertical side view, partly in section, of an apparatus for the high-speed heading of rods and the like;

FIG. 5 is a plan view, partly broken away, of the apparatus; and

FIG. 6 is a detail view of a heating device suitable for use with the apparatus of FIG. 5 in place of the induction coil there shown.

As can be seen from FIGS. 1–3, the method of the present invention involves a preheating of the rod-shaped workpiece 1, preferably by inductive heating, in which the heating has been effected progressively axially inwardly so that the end face of the workpiece is at the maximum temperature and the temperature falls off inwardly thereof. The end face 1' is adapted to abut the contact block 3' of the anvil electrode 3 (FIG. 2) while the heated zone 1" remains at an elevated temperature. In the heading press, the clamping-electrode means 2, whose relatively displaceable portion 2a and 2b are provided with contact shoes 5a and 5b, respectively, engage the periphery of the workpiece 1 just behind the heated zone. The electrodes 2 and 3 are connected across the source of a resistive-heating current, represented at 20, so that a current flows between the electrodes as indicated by the flow lines 4. The preheated end of the workpiece is thus heated to bring it to its deformation temperature.

Deformation of the original heated zone 1" commences when axial pressure is applied, as represented by the arrow 6. In FIG. 3, I show the third stage of the method of the present invention, wherein the head 1a is formed on the workpiece by continued application of pressure. As described in my copending application Ser. No. 482,231, mentioned above, the anvil 3 may be slightly yieldable, although at a rate less than that which serves to urge the rigid end 1b of the workpiece 1 to the left, for collecting the expansion of the heated zone. The workpiece slides within the contact-electrode means to increase the length of the region electrically heated in the heading press and, since this region has not had the benefit of the preheating, substantially less expansion takes place inwardly of the original heating zone, as will be apparent from FIG. 3.

In FIGS. 4 and 5, I show diagrammatically an apparatus for carrying out the method of this invention. Referring first to FIG. 5, it will be seen that the apparatus basically comprises magazine means III for delivering a supply of elongated workpieces to a preheating station I and a heading press II extending parallel to the preheating station I along a side thereof remote from the edge of the magazine means. The heating press II comprises the anvil 3 whose contact shoe 3' engages the front end of the workpiece 1, as indicated earlier. The anvil electrode is, however, formed as a piston 3a which is controlledly movable in the direction of arrow 3b within a cylinder 3c in order to control the configuration and size of the head. At a distance from the anvil electrode 3, equal substantially to the length of the preheating zone, at least as originally established, I provide the clamping-electrode means whose shoes 5a, 5b are carried upon the lower and upper electrode members 2a and 2b respectively. These electrode members being vertically displaceable in respective housings 2a' and 2b' by a control means represented at 21 and whose function will be described in greater detail hereinafter. The support 22 is provided for the workpiece 1 in the heading press while a plunger 6', axially displaceable in the direction of arrow 6 and aligned with the anvil 3, bears upon the opposite end of the workpiece and can be operated by hydraulic or pneumatic means while, in turn, triggering the controller 21, as represented by line 23. The pressure means 6' may be any conventional plunger device commonly used in heading presses.

The magazine means III comprises a plurality of rails 8 defining an inclined plane (FIG. 4) along with a stack of the workpiece rods 1 and descend under their own weight. A pair of guide bars 8', overlying the workpiece, ensure that the workpiece will lie substantially coplanar and thus do not interfere with the advance of each workpiece at the lower edge 8" of the magazine. At this lower edge, I proved a ramp 11' of a workpiece-take-up assembly generally designated 11 and adapted to receive the individual workpieces, as indicated at 1d. The lifting or first mechanism 9 is designed to elevate each of the rods 1e as they are disposed at the lower edge 8" magazine and flip them onto the receiving surface 11'. For this purpose, the mechanism 9 can include a fluid-operated cylinder 9' operated by the control means 21, as represented by line 9" to raise the bar 9a and transfer the rod to the take-up means, as indicated at 1d.

When the rod is positioned upon the receiving surface 11' at the preheating means I, it can be displaced at a controlled rate into the induction coil 10 disposed at the end of the system corresponding to the extremity of the workpiece to be headed. The mechanism of the take-up means for advancing the rod into the induction coil 10 can include a piston-and-cylinder arrangement 25 whose head 26 is provided with spring grippers 27 which frictionally engage the rod at the preheating location I to enable the latter to be withdrawn from the induction coil upon retraction of the piston assembly 26 while not impeding lateral movement of the rod out of the grippers, as will be described in greater detail hereinafter. The rate of advance or withdrawal of the take-up means is adjustable, according to an important feature of this invention, via, for example, a rate-control means 28 which can be a throttle valve connected between the hydraulic arrangement 25 and the programing device 21. It will be apparent that the rate at which the workpiece is inserted into the induction coil and withdrawn therefrom controls the temperature to which the end of the workpiece is to be heated. As will be apparent from FIG. 6, it is possible to replace the induction-heating coil 10 by a resistive-heating device consisting, for example, of a ring-like electrode 30 into which the workpiece is advanced by the take-up means 11 etc. The counterelectrode is a rod 31 held against the end of the workpiece by a light spring 32 while a resistive-heating source 33 is connected across these electrodes. Thus, the ring electrode is located in the region of the edges 34 of the workpiece while the rod electrode is concentric therewith so that the heating action takes place predominantly at the edges of the workpiece.

A further transfer mechanism is formed by a pair of levers 12, articulated at 12' to the support brackets 35 and having transfer arms 14 underlying the surface 11' but projecting beyond the workpiece disposed thereon. A pair of guides 15 arcuately extend from the receiving surface 11' of the preheating means with the center of curvature at 12' at least between the receiving surface 11' and a vertical plane 36 through the pivot axis 12' so that a swinging movement of the arms 12 in the clockwise direction (FIG. 4) under the control of a hydraulic cylinder 37 will carry the preheated rod along the arcuate surface of guides 15 until this surface leads the rod away from the arm 14 to the heading location II at which the rod 1 abuts the stop 38 of each guide surface 15. The clamping electrodes 2a, 2b, both of which may be displaceable in the vertical direction by hydraulic cylinders 2a', 2b' operated by the control 21, can then be brought into engagement with the workpiece for the heading operation, as previously described. When the heading operation is concluded, a pair of arms 13 swing downwardly about their common pivot 13' and engage the workpiece 1 for its removal from the heading location II. The arms 13 have spring-loaded jaws 39 which have flared camming surfaces 40 to enable the jaws to spring over the rod 1 when the latter is positioned in the heading press and is held in place by the abutment 38. As the arms 13 swing in the clockwise sense and carry the headed rods upwardly, they pass a stop formed by a pair of disks 41 which hold the rods 1 as the arms 13 swing therepast and rotate (arrow 42) to deposit the headed rods in a magazine behind the apparatus, not illustrated here. The arms 13 are, as indicated by line 43, controlled by the programer 21 for operation in the cadence of operation of the pressure means 6.

Serial production of headed workpieces can be carried out according to the invention by depositing a large number of rod-like workpieces 1 upon the inclined plane of the magazine 8. The rods are then individually and successively transferred in the rhythm of operation of the pressure means 6 to the preheating station I whence they are advanced and retracted by the take-up means 11, 26 etc. into and out of the heating device 10, 30, 31. Thereafter, each preheated rod is swung by arms 12 to the heading press II while a further rod is introduced to the preheating station after the previously headed rod has been removed by arm 13. While in the heading station, the clamping electrodes 2a and 2b engage the workpiece and the pressure means 6 applies the required axial force after the resistive heating current has been passed through the preheated extremity of the workpiece. Thus, each heading operation takes place concurrently with a preheating operation. The inductive heating is preferably effected by connecting the induction coil directly to a source of alternating line current whereby the control of the preheating temperature can be carried out simply by regulating the rate of operation of the take-up means for advancing the workpiece into the induction coil.

The invention described and illustrated is believed to admit of many modifications within the ability of persons skilled in the art, all such modifications being considered within the spirit and scope of the appended claims.

I claim:
1. An apparatus for the heading of elongated workpieces, comprising:
   a heading press having an anvil electrode adapted to abut one end of an electrically conductive elongated workpiece, clamping-electrode means engageable with said workpiece at a distance from said anvil electrode, means for passing an electric current through said end between said clamping-electrode means and said anvil electrode, and pressure means for axially displacing the workpiece against said anvil electrode to deform said end upon the heating thereof by said electric current;
   preheating means adjacent said heading press and including a device for heating the corresponding end of another workpiece for raising the temperature thereof prior to the disposition of said other workpiece in said heading press; and
   mechanism for removing each workpiece from said heading press and transferring thereto a workpiece with a preheated end from said preheating means.

2. An apparatus as defined in claim 1 wherein said preheating means includes shifting means for progressively displacing said corresponding end of said other workpiece into said heating device for progressively axially inwardly heating said other workpiece.

3. An apparatus as defined in claim 2 wherein said preheating means and said heading press extend generally parallel to one another with said preheating means alongside said heading press, further comprising magazine means adjacent said preheating means along a side of the latter remote from said heading press for storing multiplicity of workpieces, and further mechanism for individually feeding workpieces from said magazine means to said preheating means.

4. An apparatus as defined in claim 3 wherein said magazine means includes support means forming an inclined plane extending downwardly toward said preheating means, said preheating means including a workpiece-take-up means adjacent said inclined plane and disposed thereabove, said further mechanism including lifting means for successively elevating each workpiece at a lower end of the inclined plane for depositing it upon said workpiece-take-up means.

5. An apparatus as defined in claim 4 wherein the first-mentioned mechanism includes a ramp extending from said preheating means to said heading press, first arm means swingable for carrying a workpiece on said workpiece-take-up means along said ramp to said heading press, and second arm means engageable with a workpiece in said heading press to enable said heading press to receive a successive workpiece.

6. An apparatus as defined in claim 5, further comprising control means for operating said lifting means and said first and second arm means in the cadence of operation of said pressure means.

References Cited
UNITED STATES PATENTS

| | | | |
|---|---|---|---|
| 1,605,535 | 11/1926 | Foisy | 72—342 |
| 1,894,526 | 1/1933 | Wilcox | 72—405 |
| 2,495,060 | 1/1950 | Hanna | 72—342 |
| 2,743,509 | 5/1956 | Friedman | 72—364 |

CHARLES W. LANHAM, *Primary Examiner.*

L. A. LARSON, *Assistant Examiner.*